(12) United States Patent
Trakas

(10) Patent No.: US 7,207,790 B2
(45) Date of Patent: Apr. 24, 2007

(54) NEEDLE ASSEMBLY WITH ADJUSTABLE GATING NEEDLE POSITION FOR INJECTION MOLDING NOZZLE

(76) Inventor: Panos Trakas, 1769 Whispering Ct., Addison, IL (US) 60101

( * ) Notice: Subject to any disclaimer, the term of this patent is extended or adjusted under 35 U.S.C. 154(b) by 304 days.

(21) Appl. No.: 10/884,094

(22) Filed: Jul. 2, 2004

(65) Prior Publication Data

US 2006/0003047 A1    Jan. 5, 2006

(51) Int. Cl.
*B29C 45/20* (2006.01)

(52) U.S. Cl. .................. 425/190; 425/192 R; 425/542

(58) Field of Classification Search ................ 425/542, 425/190, 192 R
See application file for complete search history.

(56) References Cited

U.S. PATENT DOCUMENTS

| | | |
|---|---|---|
| 4,161,386 A | 7/1979 | Osuna-Diaz |
| 4,196,855 A | 4/1980 | Osuna-Diaz |
| 4,266,723 A | 5/1981 | Osuna-Diaz |
| 4,279,582 A | 7/1981 | Osuna-Diaz |
| 4,279,588 A | 7/1981 | Gellert |
| 4,434,053 A | 2/1984 | Osuna-Diaz |
| 4,562,481 A | 12/1985 | Trakas |
| 4,652,230 A | 3/1987 | Osuna-Diaz |
| 4,698,013 A | 10/1987 | Butcher |
| 4,787,836 A | 11/1988 | Osuna-Diaz et al. |
| 4,882,469 A | 11/1989 | Trakas |
| 4,899,435 A | 2/1990 | Trakas |
| 4,900,560 A | 2/1990 | Trakas |
| 4,906,360 A | 3/1990 | Trakas |
| 4,988,848 A | 1/1991 | Trakas |
| 5,052,100 A | 10/1991 | Trakas |
| 5,055,028 A | 10/1991 | Trakas |
| 5,067,893 A | 11/1991 | Osuna-Diaz |

(Continued)

FOREIGN PATENT DOCUMENTS

EP    0373 293 B1    6/1990

(Continued)

OTHER PUBLICATIONS

Kona Corporation Bulletin 601 "Kona Product Profile", Sep. 1987.

(Continued)

*Primary Examiner*—Yogendra N. Gupta
*Assistant Examiner*—Emmanuel S. Luk
(74) *Attorney, Agent, or Firm*—Cook, Alex, McFarron, Manzo, Cummings & Mehler, Ltd.

(57) ABSTRACT

An injection molding nozzle is disclosed in which the body has a front end and a central bore terminating at the front end, the front end receiving a needle assembly. The needle assembly has an outer retaining piece adapted to be removeably secured to the front end of the body. The inner piece of the needle assembly is adapted to be received within the outer retaining piece and includes a gating needle that extends through the central opening of the outer retaining piece so as to be in close proximity to the gate of the mold cavity. One or more spacers are provided that are selectively positioned between the inner piece and a shoulder in the front end of the body and a shoulder in the outer retaining piece, thus permitting adjustable axial positioning of the gating needle with respect to the central opening of the outer retaining piece.

17 Claims, 2 Drawing Sheets

U.S. PATENT DOCUMENTS

| | | |
|---|---|---|
| 5,078,589 A | 1/1992 | Osuna-Diaz |
| 5,098,280 A | 3/1992 | Trakas |
| 5,106,291 A | 4/1992 | Gellert |
| 5,136,141 A | 8/1992 | Trakas |
| 5,141,696 A | 8/1992 | Osuna-Diaz |
| 5,147,663 A | 9/1992 | Trakas |
| 5,180,594 A | 1/1993 | Trakas |
| 5,206,040 A | 4/1993 | Gellert |
| 5,208,052 A | 5/1993 | Schmidt et al. |
| 5,299,928 A | 4/1994 | Gellert |
| 5,334,010 A | 8/1994 | Teng |
| 5,645,874 A | 7/1997 | Osuna-Diaz |
| 5,670,190 A | 9/1997 | Osuna-Diaz |
| 5,785,915 A | 7/1998 | Osuna-Diaz |
| 5,849,343 A | 12/1998 | Gellert et al. |
| 5,851,571 A | 12/1998 | Manner |
| 5,935,615 A | 8/1999 | Gellert et al. |
| 6,074,593 A | 6/2000 | Osuna-Diaz |
| 6,270,711 B1 | 8/2001 | Gellert et al. |

FOREIGN PATENT DOCUMENTS

| | | |
|---|---|---|
| EP | 0 407 683 B1 | 1/1991 |
| EP | 0 657 270 A1 | 6/1995 |
| EP | 1 025 974 A2 | 8/2000 |

OTHER PUBLICATIONS

Kona Corporation Bulletin 402 "Pre-Engineered Hot Runner Systems Selection Guide".

NEEDLE ASSEMBLY WITH ADJUSTABLE GATING NEEDLE POSITION FOR INJECTION MOLDING NOZZLE

BACKGROUND OF THE INVENTION

The present invention relates to an injection molding nozzle and, and more particularly, to a needle assembly for an injection molding nozzle that permits selective, incremental axial adjustment of the gating needle with respect to the face of the mold gate.

In injection molding processes, pressurized molten plastic material, or melt, is directed from a heated nozzle through a gate into a mold cavity. Typically, the front end of the nozzle may include a central gating needle or "torpedo" that extends past the outlet of the nozzle so as to be in proximity to the gate of the mold cavity. The position of the gating needle with respect to the gate affects the way the melt behaves around the gate. For example, the molded product may have a "gate vestige" attached thereto at the gate location. The position of the gating needle can be adjusted to reduce the likelihood of a gate vestige, and thus produce a more cosmetically pleasing appearance for the finished products.

Thus, in setting-up or qualifying an injection molding system for production, it is not uncommon for there to be a need to adjust the positioning of the gating needle with respect to the gate in order to, e.g., effect the flow rate and/or heat transfer at the gate. In addition, after the injection molding system is initially set-up, the gating needle erodes or wears away due to the abrasive nature of the melt or chemical interaction between the melt and the metal comprising the gating needle.

Typically, advancement of the gating needle into the gate has required removing the mold from the machine, disassembling the mold, and grinding the mold, while retraction of the needle has required grinding or filing the gating needle to adjust the extent to which it extends beyond the outlet of the nozzle. As can be readily appreciated, such procedures for making relatively minor adjustments in the position of the gating needle are both inexact and time consuming.

Accordingly, it is an object of the present invention to provide a needle assembly with an adjustable gating needle for an injection molding nozzle.

More specifically, it is an object of the present invention to provide a needle assembly having a gating needle in which the needle may be adjusted without machining or otherwise working the needle or mold plates.

It is also an object of the present invention to provide such an adjustable gating needle assembly where the adjustment may be made selectively and incrementally with a high degree of accuracy.

It is a further object of the invention to provide such a gating needle whose adjustment is achieved simply by disassembly and reassembly of the parts comprising the needle assembly.

SUMMARY OF THE INVENTION

These objects, as well as others that will become obvious upon reference to the following detailed description and accompanying drawings, are attained by an injection molding nozzle in which the body has a central bore and terminates at the front end of the nozzle to allow for the passage of melt therethrough. The front end of the nozzle receives a needle assembly that has an outer retaining piece adapted to be removeably secured to the body at the front end of the nozzle. The inner piece of the needle assembly is adapted to be received within the outer retaining piece and includes a pointed gating needle that extends through the central opening of the outer retaining piece so as to be in proximity to the gate of the mold cavity. One or more spacers are provided that are selectively positioned between the inner piece and the front end of the nozzle and the outer retaining piece, thus permitting adjustable axial positioning of the tip of the gating needle with respect to the central opening of the outer retaining piece when the outer retaining piece and inner piece are assembled onto the body of the nozzle.

In a preferred embodiment, the inner piece includes a radially enlarged portion that fits between two interior shoulders on the front end of the nozzle and outer retaining piece, respectively. The spacers are selectively positioned between the enlarged portion of the inner piece and the internal shoulders to vary the extent to which the gating needle on the inner piece extends through the central opening of the outer retaining piece.

DETAILED DESCRIPTION

Figure 1:
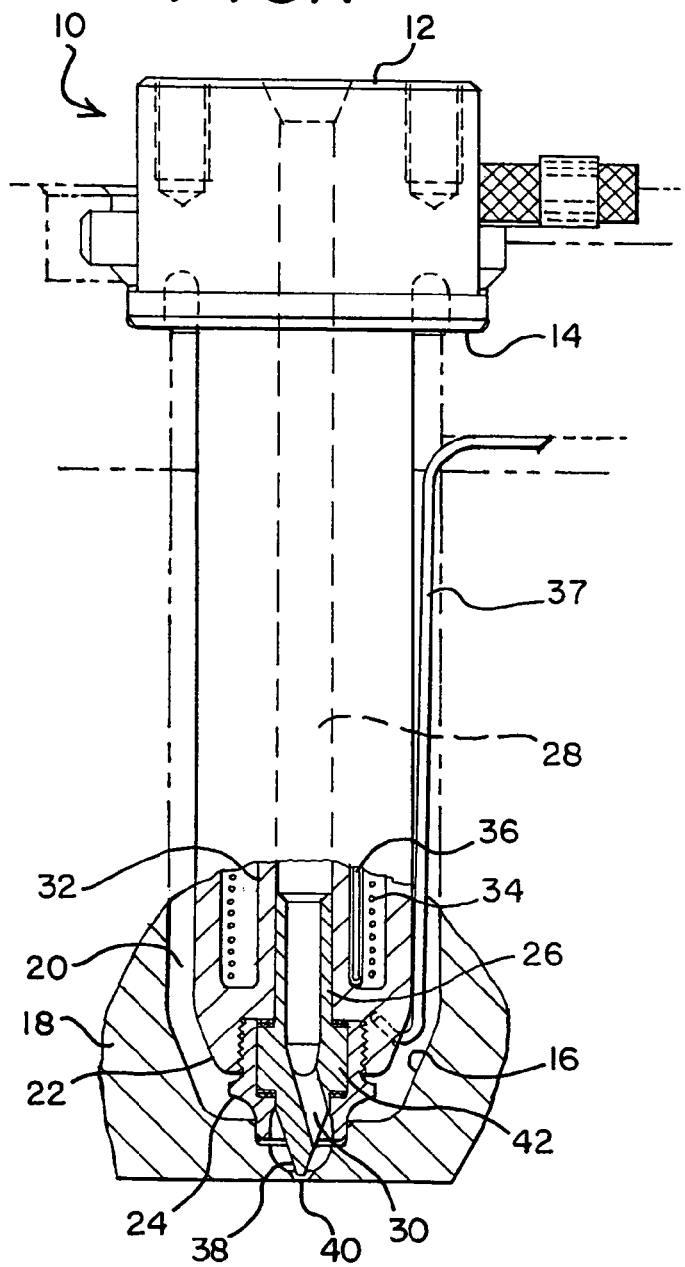
FIG. 1 is an elevational view of an injection molding nozzle, in partial cross-sectional view, embodying the present invention.

Turning to the drawings, there is seen in FIG. 1 a heated nozzle 10 for use in connection with a multi-cavity injection molding system (not shown). Multi-cavity injection molding systems are well known in the art, as exemplified by, e.g., U.S. Pat. Nos. 5,147,663 and 4,900,560 to Trakas, which are incorporated herein by reference. Several such heated nozzles 10 are inter-connected by a melt distribution manifold to facilitate the introduction of melt through a series of gates into a mold cavity.

As is typical, the nozzle 10 includes a rear end 12 that abuts the front face of the melt distribution manifold. The nozzle 10 includes a locating flange 14 that seats on a shoulder in the well 16 of the manifold plate (shown in partial fragment at 18), thus forming an insulative air space 20 between the heated nozzle 10 and the cooled mold 16.

The nozzle 10 includes a threaded front end 22 that receives a nozzle seal. The nozzle seal comprises a complimentarily threaded outer retaining piece 24 and an inner piece 26, which make up a needle assembly that is discussed in detail below. If desired, the outer or retaining piece 24 of the nozzle seal can be of a material that is thermally less conductive than the inner piece 26, which is preferably thermally highly conductive.

The nozzle 10 includes a central bore 28 that is in fluid communication with the melt passage of the manifold so as to convey melt therethrough. The melt then flows through a melt duct 30 in the inner piece 26 of the needle assembly. As is shown, the exit of the melt duct 30 is at an angle from the center of the nozzle 10 to provide a side discharge. However, the exit of the melt duct 30 may be centrally located, or concentric with the tip of the inner piece 26, without departing from the invention.

The nozzle 10 includes a heater cavity 32 that receives an electrical heating element or core 34 and a thermocouple 36.

The nozzle 10 may also optionally include a thermocouple 37 supported on its outer surface so as to reside in the insulative air space 20.

As described in U.S. Pat. No. 5,055,028 to Trakas, which is incorporated by reference herein, the volume of the heater cavity 32 not occupied by the heater core 34 and thermocouple 36 is preferably filled with a substantially void-free, compacted particulate refractory ceramic material such as, for example, magnesium oxide. As described in the referenced patent, the ceramic refractory material of choice, magnesium oxide, provides excellent heat transfer capabilities at high temperatures when it is compacted.

As illustrated, the inner piece 26 of the needle assembly includes a gating needle, generally indicated by 38, that extends through the distal opening in the outer piece 24. When the nozzle is positioned in the mold 18, the tip of the gating needle 38 of the inner piece 26 is disposed in close proximity to the mold gate 40, through which melt enters into the mold cavity. The proximity of the gating needle 38 to the gate 40 controls the cross-sectional area of the gate through which the melt flows. Specifically, as the tip of the gating needle 38 is axially advanced toward or into the gate, the smaller the area through which melt can flow. Additionally, the proximity of the tip of the gating needle 38 to the gate 40 affects the heat transfer at the gate. Specifically, the closer the proximity of the gating needle 38 to the gate 40, the more heat is transferred to the gate prior to the injection cycle, or removed from the gate during the cooling cycle. Thus, depending upon the circumstances, one may want to axially advance the gating needle 38 toward the gate 40 (e.g., to provide more heat transfer at the face of the gate), or draw the gating needle 38 axially away from the gate (e.g., to increase the flow rate of the melt, and thus decrease the cycling time of the injection molding process).

In keeping with the invention, the needle assembly is constructed so that axial adjustment of the gating needle on the inner piece with respect to the face of gate 40 is facilitated. To this end, one or more spacers or shims are provided between the outer retaining piece 24, inner piece 26, and the front end 22 of the nozzle.

Figure 2:
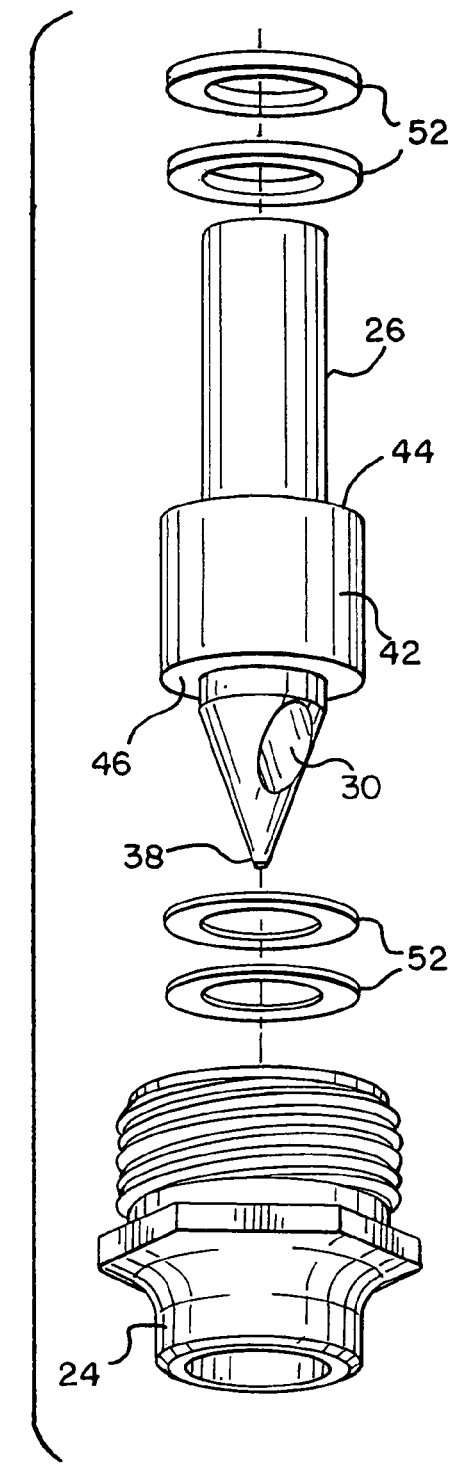
FIG. 2 is an exploded perspective view of a needle assembly in accordance with the present invention.
Figure 3:
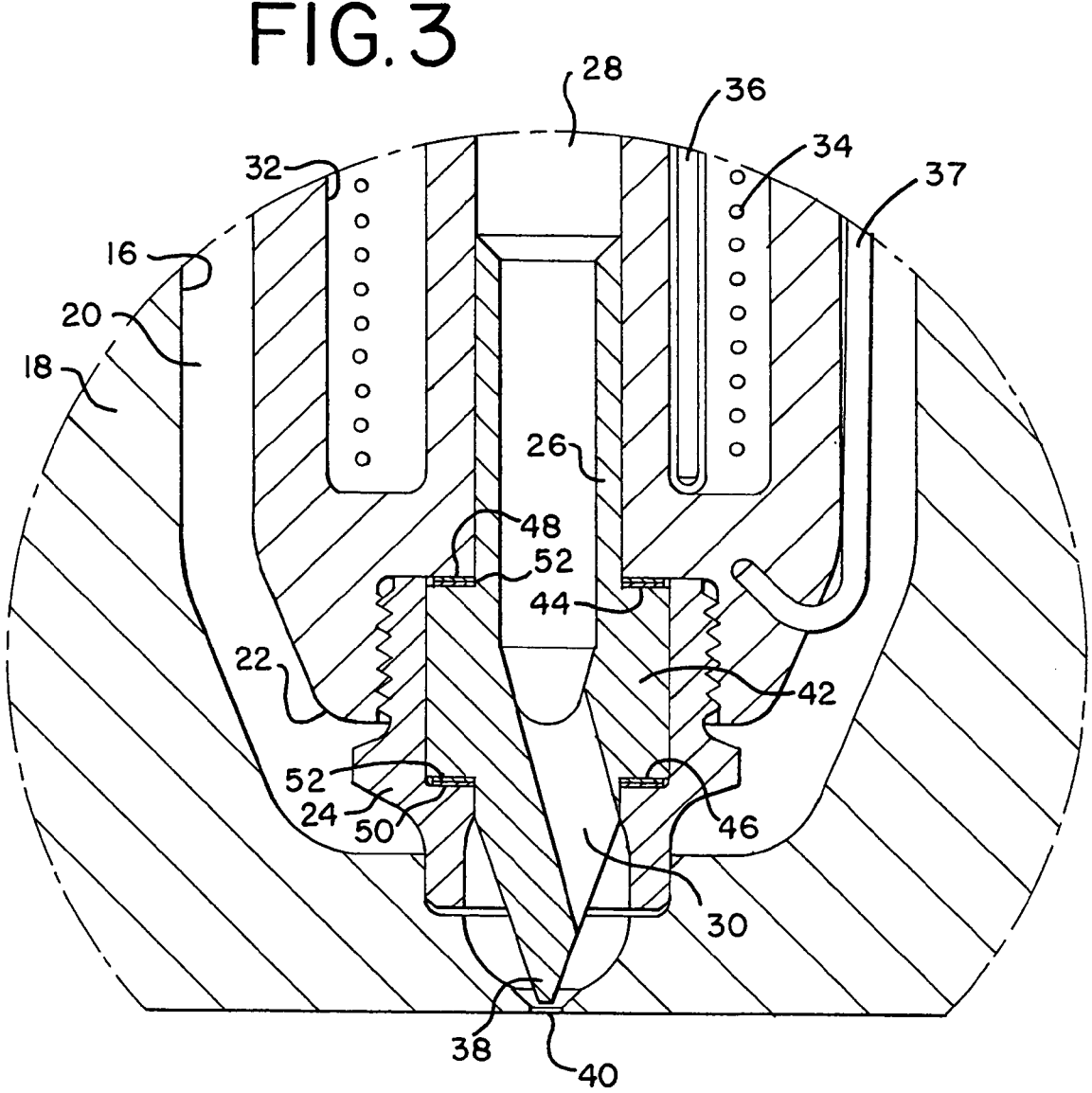
FIG. 3 is an enlarged cross-sectional view of the front end of the nozzle of FIG. 1.

As best seen in FIGS. 2 and 3, the inner piece 26 is formed with a central portion 42 that is radially enlarged with respect to both the central bore 28 of the nozzle 10 and the front opening of the outer piece 24. Thus, the central portion 42 of the inner piece 26 has opposed shoulders 44, 46 that are received between cooperating shoulders 48, 50 on the interior of the front end 22 of the nozzle and on the interior of the retaining piece 24, respectively.

As illustrated, two shims or spacers 52 are located between each of the upper and lower shoulders 44, 46 on the inner piece and the shoulders 48, 50 on the front end 22 of the nozzle and outer piece 24. However, as can be readily appreciated, the nozzle seal may be assembled and placed on the nozzle with five different combinations of the four shims 52 between the shoulders 44, 48 and 46, 50 to adjust the extent to which the tip of the gating needle extends past the retaining piece 24. The tip of the gating needle 38 will extend to its greatest extent when all four shims 52 are located between the upper shoulder 44 on the inner piece and the shoulder 48 in the front end 22 of the nozzle. In contrast, the tip of the gating needle will extend to its least extent when all four shims 52 are located between the lower shoulder 46 on the inner piece 26 and the interior shoulder 50 on the retaining piece 24. As can be appreciated, the central portion 42 of the inner piece 26 has an axial length such that the distance between the shoulders 48, 50 is equal to the axial length of the central portion 42 plus the combined thickness of the shims 52.

The shims 52 may be made of, e.g., stainless steel and are preferably sized to have a thickness of 0.005 inches, thus permitting adjustment of the location of the tip of the gating needle 38 with respect to the gate 40 in increments of 0.005 inches. More preferably, each of the four shims 52 may be of a different thickness (as shown in FIG. 2), e.g., 0.001, 0.002, 0.003 and 0.005 inches, to facilitate a smaller incremental range for the adjustment of the needle. Also, while four such shims 52 are shown, any number of one or more of shims 52 may be used. As can be appreciated, if only a single shim is used, there are just two positions between which the tip of the gating needle 38 can be moved with respect to the face of the gate 40.

Thus, a needle assembly has been provided that meets all the objects of the present invention. Indeed the invention permits easy reconditioning and repositioning of the gating needle by selectively arranging the spacers to advance the gating needle. As no additional parts are required to recondition and reposition the gating needle, costly down-time and the need to maintain an inventory of spare parts are avoided. While the invention has been described in terms of a preferred embodiment, there is no intent to limit it to the same. Instead, the invention is defined by the scope of the following claims.

What is claimed is:

1. A needle assembly for use in an injection molding nozzle, the nozzle comprising a body with a front end with an interior shoulder and a central bore terminating at the front end for passage of melt into a mold gate, the needle assembly comprising:
   an outer retaining piece having a central opening with an interior shoulder and adapted to be removeably secured to the front end of the body;
   an inner piece adapted to be received within the outer retaining piece and having a radially enlarged portion defining opposed faces, a melt passage and a tip, the tip being adapted to extend through the central opening of the outer retaining piece; and
   at least one spacer having a given thickness, the spacer being selectively positioned between one of the opposed faces on the inner piece and either the interior shoulder in the front end of the body or the interior shoulder in the outer retaining piece to permit selective adjustable axial positioning of the tip of the inner piece with respect to the central opening of the outer retaining piece upon assembly of the outer retaining piece and inner piece with respect to the front end of the body, the inner piece being stationary with respect to the outer piece after assembly.

2. The needle assembly of claim 1 wherein the at least one spacer comprises two or more spacers.

3. The needle assembly of claim 2 wherein each of the spacers has a substantially identical thickness.

4. The needle assembly of claim 2 wherein each of the spacers has a different thickness.

5. The injection molding nozzle of claim 4 wherein the spacers vary in thickness by increments of at least 0.001 inch.

6. The injection molding nozzle of claim 3 wherein each of the spacers has a thickness of approximately 0.005 inch.

7. An injection molding nozzle comprising:
   a body with a front end with an interior shoulder and a central bore terminating at the front end for passage of melt into a mold gate;

an outer retaining piece having a central opening with an interior shoulder and adapted to be removeably secured to the body at the front end;

an inner piece adapted to be received within the outer retaining piece and having a radially enlarged portion defining opposed faces, and a gating needle with a melt passage and a tip, the tip being adapted to extend through the central opening of the outer retaining piece; and at least one spacer having a given thickness, the spacer being selectively positioned between one of the opposed faces on the inner piece and either the interior shoulder in the front end of the body or the interior shoulder in the outer retaining piece to permit selective adjustable axial positioning of the tip of the gating needle with respect to the central opening of the outer retaining piece upon assembly of the outer retaining piece and inner piece with respect to the front end of the body, the inner piece being stationary with respect to the outer piece after assembly.

8. The injection molding nozzle of claim 7 wherein the at least one spacer comprises two or more spacers.

9. The needle assembly of claim 8 wherein each of the spacers has a substantially identical thickness.

10. The injection molding nozzle of claim 8 wherein each of the spacers has a different thickness.

11. The injection molding nozzle of claim 10 wherein the spacers vary in thickness by increments of at least 0.001 inch.

12. The injection molding nozzle of claim 9 wherein each of the spacers has a thickness of approximately 0.005 inch.

13. An injection molding nozzle comprising:

a body with a front end and a central bore terminating at the front end, the front end having a first internal shoulder;

an outer retaining piece adapted to be removeably secured to the body at the front end and having a central opening and a second internal shoulder;

an inner piece having a radially enlarged portion adapted to be received between the first shoulder in the front end and the second shoulder in the outer retaining piece, the inner piece further having a gating needle with a melt passage and a tip, the tip being adapted to extend through the central opening of the outer retaining piece; and at least two spacers, each having a given thickness, each spacer being selectively positioned between the enlarged portion of the inner piece and one of the first and second shoulders in the front end of the body and the outer retaining piece to permit selective adjustable axial positioning of the gating needle with respect to the central opening of the outer retaining piece upon assembly of the outer retaining piece and inner piece with respect to the body.

14. The injection molding nozzle of claim 13 wherein each of the spacers has a substantially identical thickness.

15. The injection molding nozzle of claim 13 wherein each of the spacers has a different thickness.

16. The injection molding nozzle of claim 15 wherein the spacers vary in thickness by increments of at least 0.001 inch.

17. The injection molding nozzle of claim 14 wherein each of the spacers has a thickness of approximately 0.005 inch.

* * * * *